Aug. 21, 1945.   L. R. FEINAUER ET AL   2,383,302
LIQUID PURIFICATION
Filed Aug. 20, 1943
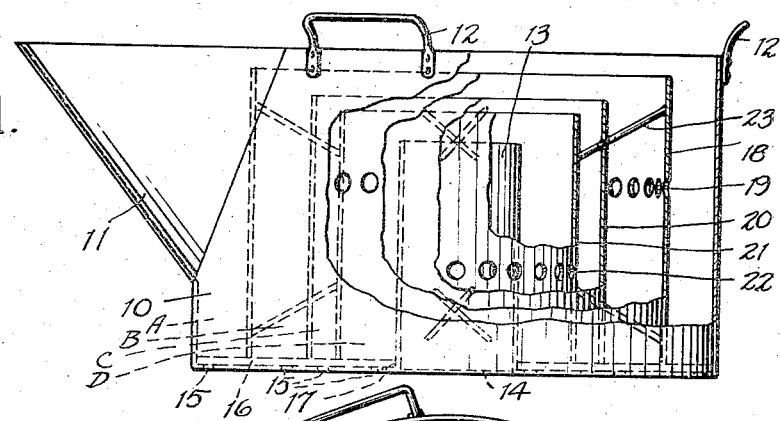
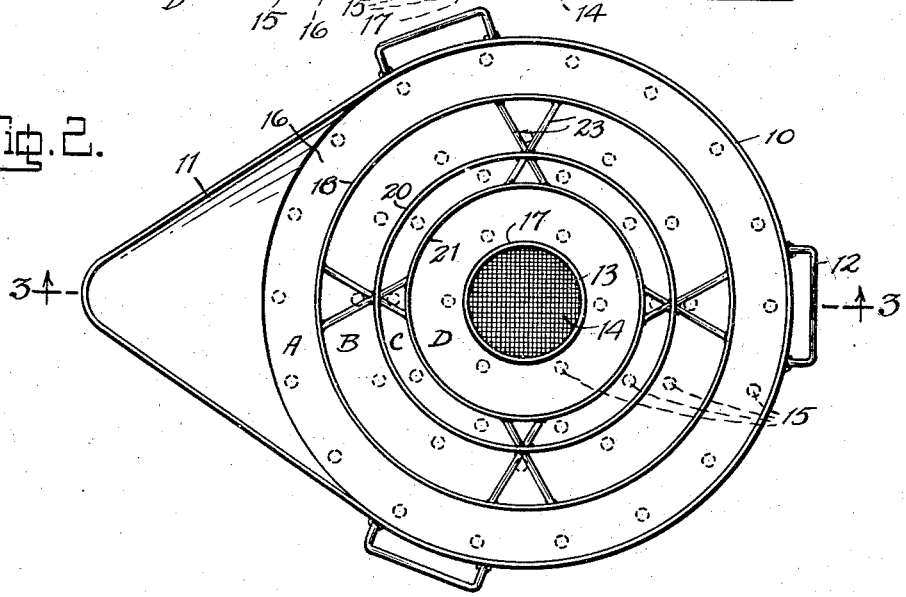
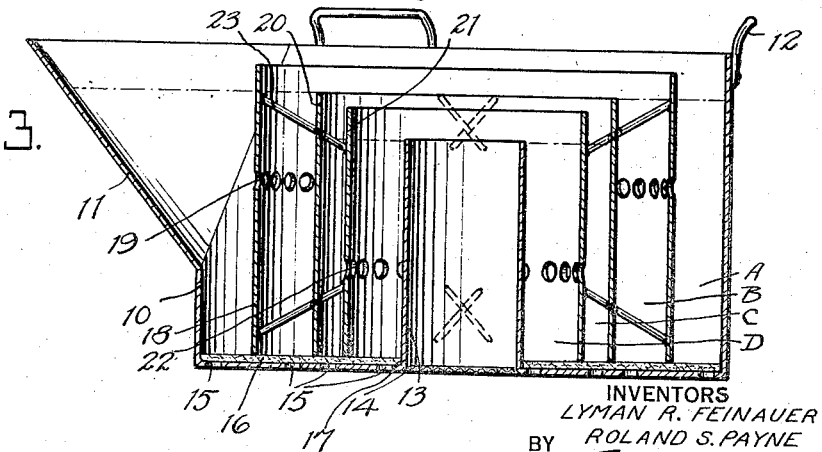
INVENTORS
LYMAN R. FEINAUER
ROLAND S. PAYNE
BY
ATTORNEYS Patented Aug. 21, 1945

2,383,302

UNITED STATES PATENT OFFICE 2,383,302

LIQUID PURIFICATION

Lyman R. Feinauer and Roland S. Payne, Salt Lake City, Utah, assignors to Remington Arms Company, Inc., Bridgeport, Conn., a corporation of Delaware Application August 20, 1943, Serial No. 499,308

12 Claims. (Cl. 210—43)

The present invention relates to an improvement in liquid purification, and particularly a filter apparatus for the removal from liquids of solid material carried in suspension therein. While the invention is adaptable for various filtering uses it is especially advantageous in the filtering of wash water containing primer or other explosive mixtures employed in the manufacture of ammunition. Primer mixture is such that in its dry state it is highly explosive, and consequently, the mixture and the hazardous area where it is handled in the manufacture of ammunition are maintained in a wet state. The wash water resulting from this procedure contains a considerable percentage of the primer or other explosive material, which being insoluble remains in suspension in the water, and if this water is allowed to escape it may subsequently result in the dangerous condition that the explosive mixture may be precipitated in remote places where it will dry out and thereupon be capable of exploding. It is therefore highly desirable that the hazardous explosive material in the wash water be completely removed before the water is allowed to escape.

An object of the invention is to provide a filter apparatus into which the wash water flows, and wherein it is subject to a series of filtering and baffling stages designed to effectually reduce agitation to the minimum and to subject the water to rapid and complete filtering, irrespective of the gradual accumulation of the solid material in the filter medium.

It is proposed according to the invention to provide a series of filter compartments each having a filtering medium in relation thereto through which the water drains by gravity, these compartments being in successive communication with each other through the rising of the wash water therein to predetermined points, such rising being controlled through the gradual accumulation of the solid material in the filtering medium. Consequently, as the filtering medium in one compartment becomes clogged to the point that the water will not drain therethrough, the water then flows to the next compartment where the process is repeated, and finally as the filtering medium in the last compartment becomes clogged the apparatus is cleaned and the filtering medium is renewed.

It is further proposed to provide a communication and baffling or weir structure between the compartments whereby the flow between the successive compartments takes place at relatively high levels, so that agitation of the wash water in the vicinity of the filtering medium is reduced to a minimum, thereby allowing for the effective settling of the solid material and its retention on the filtering medium.

With the above and other objects in view an embodiment of the invention is shown in the accompanying drawing, and this embodiment will be hereinafter more fully described with reference thereto, and the invention will be finally pointed out in the claims.

In the drawing—

Fig. 1 is a side elevation, partially broken away, of a filter apparatus, according to the illustrated exemplary embodiment of the invention.

Fig. 2 is a plan view thereof.

Fig. 3 is a vertical sectional view, taken along the line 3—3 of Fig. 2, and showing in dot-and-dash lines the levels of the wash water at the point where filtering has progressed through the several compartments and the filtering medium in the several compartments has reached the stage of complete clogging.

Similar reference characters indicate corresponding parts throughout the several figures of the drawing.

Referring to the drawing, the filter apparatus, according to the illustrated exemplary embodiment of the invention, is a weir type sump and comprises a relatively deep cylindrical metal container 10 provided at one side with a relatively wide spout 11 through which the water to be filtered is introduced, the upper edge of the spout being in the plane of the upper edge of the container and its lower surface being inclined downwardly and inwardly from the upper edge to a point substantially spaced from the floor or base of the container. Suitable hand grips 12 are provided at spaced points about the upper edge of the container for convenience in handling. Centrally of the floor of the container there is provided a circular opening having an upstanding cylindrical wall 13 secured therein, the upper end of this wall terminating in a plane substantially below the upper edge of the container. A sieve 14 of relatively fine woven wire is secured within the lower end of the passage through the wall 13.

In concentric relation about the cylindrical wall 13 the floor of the container is provided with a plurality of circular series of spaced drainage holes 15, these being provided in predetermined concentric circles so that each series is disposed within the base of one of the filter compartments of the container, determined by the removable baffle or weir member, presently to be more fully described. Upon the floor of the container beneath the removal baffle member there is provided a removable filter element 16, formed of suitable filtering material, as for instance cotton bat, this filter element being of circular form to completely engage the floor of the container and provided with a central aperture 17 to engage about the outer surface of the cylindrical wall 13.

The removal baffle or weir member comprises an outer cylindrical baffle drum 18, disposed in concentric inwardly spaced relation to the cylindrical wall of the container, and of a height less than the height of the wall of the container, this drum being provided at a substantial distance from its lower edge, and preferably in a plane relatively closer to its upper edge than its lower edge, with a series of spaced ports 19. In inwardly spaced concentric relation to the drum 18 there is provided an intermediate cylindrical baffle drum 20, preferably inwardly spaced from the outer drum 18 a distance substantially corresponding to the distance of the outer drum inwardly from the cylindrical wall of the container, the lower edge of the drum 20 being in the same plane with the lower edge of the drum 18 while its upper edge is in a plane spaced below the upper edge of the drum 18 and substantially above the plane of the ports 19. An inner baffle drum 21 is provided in inwardly spaced concentric relation to the intermediate drum 20, its lower edge being in the plane of the lower edges of the drums 20 and 18 and its upper edge being spaced below the plane of the upper edge of the drum 20 and above the plane of the upper edge of the cylindrical wall 13. The concentric spacing of the inner drum 21 from the drum 20 is substantially less than the spacing of the drum 20 from the drum 18 and preferably the outward spacing of the drum 21 from the cylindrical wall 13 is substantially equal to the spacing of the intermediate drum 20 from the outer drum 18. At a substantial distance from the lower edge of the drum 20, preferably in a plane substantially midway between the lower edge of the drum and the plane of the ports 19, there is provided a series of ports 22. The several drums 18, 20 and 21 are rigidly secured together by means of suitably placed brace bars 23, welded or otherwise suitably connected to the drum.

In the assembled relation of the baffle member within the container the outer circular series of holes 15 is disposed in the base of the compartment between the outer drum 18 and the wall of the container, while the other circular series of holes are in the bases of the respective compartments provided by the baffle member, the inner circular series of holes 15 being in the base of the compartment formed by the inner drum 21 and the circular wall 13.

In the operation of the filter apparatus the wash water, containing primer or other explosive solid materials in suspension, is flowed into the container at its spout portion 11 and during the initial filtering operation is confined to the outer filter compartment A, the filtering taking place by gravity drainage through the annular portion of the filter element 16 within the base of this compartment, and upon which the solid material collects, the filtered water flowing through the drain holes 15 to a suitable disposal conduit or drain. As the solid material builds up in the base of the compartment A the drainage through the filter is gradually reduced, causing a proportionate rise of the water in the compartment A, the rate of rise reaching its maximum when the solid material completely clogs the filter element so that no more water can pass therethrough.

As the water in the compartment A rises to the level of the ports 19 it flows into the compartment B between the drums 18 and 20, the height of the ports 19 being sufficiently great so that there is a minimum of agitation of the water in the lower portion of the container in the area contiguous to the solid material collected upon the filter. This allows for a continued settling of any particles of solid material remaining in the quiescent water in the compartment A below the ports 19. The water flowing into the compartment B is filtered by the annular portion of the filter element 16 in the base of this compartment, draining through the annular series of holes 15 therein. The water gradually rises in the compartment B to the plane of the ports 19, where it meets the level of the water in the compartment A, and thereupon the continued flow of water into the container gradually rises in both compartments A and B until it reaches the upper edge of the baffle drum 20. During this flow of the water from the compartment A to the compartment B the water in the compartment B below the ports 19 remains in a relatively quiescent state, so that any solid particles remaining therein may settle upon the filter element without appreciable agitation.

As drainage through the base of the compartment B is gradually reduced, and finally ceases through clogging of the filter element, the water flows over the upper edge of the baffle drum 20 into the compartment C between the drums 20 and 21, the relatively greater height of the drum 18 preventing back-flow between the compartments. The water collecting in the compartment C is filtered through the annular portion of the filter element in its base and drains through the holes 15, gradually rising as the filter element becomes clogged to the level of the ports 22 in the baffle drum 21, whereupon it starts to flow into the compartment D between the drum 21 and the cylindrical wall 13.

Because of the relatively shorter distance from the base of the container of the ports 22 than the ports 19, and in order to reduce agitation to a minimum the compartment C is made substantially narrower than the compartment D so that there is a relatively rapid flow of the water into the compartment C and a relatively slow rise of the water in the compartment D. As the level of the water in the compartment D rises above the ports 22 there is a corresponding rise of the water in the compartments C and D, this rise being relatively slow and permitting of settling of the solid material in the bases of both compartments C and D with a minimum of agitation. At this point the water flowing into the compartment D flows from the upper portion of the compartment A of the container through the ports 19 of the drum 18, through the upper portion of the compartment B, over the upper edge of the drum 20, through the upper portion of the compartment C, and through the ports 22 of the drum 21, this relatively long passage of the water through the several compartments and around the baffles, together with the relatively slow rise of the water in the compartments C and D, permitting a continued settling of the solid material in the several compartments and a relatively increased time for filtering of the water flowing into relation with the filter element in the base of the compartment D, thus compensating for the relatively smaller area of the compartment D.

As the filter element in the compartment D becomes clogged, thereby completing the clogging of the entire filter element, the level of the water in the compartment D approaches the upper edge of the overflow cylindrical wall 13. At this point the filtering operation is discontinued to permit cleaning and renewal of the clogged filter element, the water remaining in the container being first removed and added to the wash water to be filtered to thus prevent the possibility of any solid material remaining therein reaching the disposal drain. Should the water in the compartment D overflow the cylindrical wall 13 it will be further filtered by passing through the wire gauze filter element 14.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a filtering apparatus, a liquid container having a plurality of successively arranged liquid-receiving walled compartments, one of which constitutes an initial filtering compartment in which the liquid to be filtered is initially flowed, and each of said compartments having a liquid drainage base, filtering means in relation to the bases of said compartments adapted to filter solid material from liquid passing therethrough, and an impervious baffle wall separating said compartments having overflow means at a substantial distance above the bases of said compartments whereby the liquid rises in said initial compartment and overflows into the adjacent compartment as filtered solid material collecting in the filter means of said initial compartment arrests the drainage of liquid therethrough.

2. In a filtering apparatus, a liquid container having a plurality of successively arranged liquid-receiving walled compartments, one of which constitutes an initial filtering compartment in which the liquid to be filtered is initially flowed, each of said compartments having a liquid drainage base, a removable filtering element covering the bases of said compartments adapted to filter solid material from liquid passing therethrough, and a removable impervious baffle wall separating said compartments having overflow means at a substantial distance above the bases of said compartments whereby the liquid rises in said initial compartment and overflows into the adjacent compartment as filtered solid material collecting in the filter element in said initial compartment arrests the drainage of liquid therethrough.

3. In a filtering apparatus, a liquid container having a plurality of successively arranged liquid receiving walled compartments, one of which constitutes an initial filtering compartment in which the liquid to be filtered is initially flowed, and each of said compartments having a liquid drainage base, filtering means in relation to the bases of said compartments adapted to filter solid material from liquid passing therethrough, and an impervious baffle wall separating said compartments having overflow ports at a substantial distance above the bases of said compartments and substantially below its upper edge whereby the liquid rises in said initial compartment and overflows into the adjacent compartment as filtered solid material collecting in the filter means of said initial compartment arrests the drainage of liquid therethrough.

4. In a filtering apparatus, a liquid container having a plurality of successively arranged liquid-receiving walled compartments, one of which constitutes an initial filtering compartment in which the liquid to be filtered is initially flowed, and each of said compartments having a liquid drainage base, filtering means in relation to the bases of said compartments adapted to filter solid material from liquid passing therethrough, and a baffle wall separating said compartments having overflow ports at a substantial distance above the bases of said compartments and substantially below its upper edge, whereby the liquid rises in said initial compartment and overflows into the adjacent compartment as filtered solid material collecting in the filter means of said initial compartment arrests the drainage of liquid therethrough, the wall of said initial compartment opposed to said baffle wall being higher than said baffle wall and the wall of said adjacent compartment opposed to said baffle wall being lower than said baffle wall and higher than said overflow ports.

5. In a filtering apparatus, a liquid container having a circumferential side wall, a base having a central passage, and an upstanding overflow wall centrally of said base surrounding said central passage, a baffle element engaged in said container comprising impervious walls dividing it into a plurality of successively arranged annular liquid receiving compartments, the outer one of which constitutes an initial filtering compartment in which the liquid to be filtered is initially flowed, said base having drainage holes for each of said compartments, filtering means in relation to the bases of said compartments adapted to filter solid material from liquid passing therethrough, the outer wall said baffle element having overflow means at a substantial distance above said base whereby the liquid rises in said initial compartment and overflows into the adjacent compartment as filtered solid material collecting in the filter means in said initial compartment arrests the drainage of liquid therethrough.

6. In a filtering apparatus, a liquid container having a circumferential side wall, a base having a central passage, and an upstanding overflow wall centrally of said base surrounding said central passage, filter means extending across said central passage, a baffle element engaged in said container comprising impervious walls dividing it into a plurality of successively arranged annular liquid receiving compartments, the outer one of which constitutes an initial filtering compartment in which the liquid to be filtered is initially flowed, said base having drainage holes for each of said compartments, filtering means in relation to the bases of said compartments adapted to filter solid material from liquid passing therethrough, the outer wall of said baffle element having overflow means at a substantial distance above said base whereby the liquid rises in said initial compartment and overflows into the adjacent compartment as filtered solid material collecting in the filter means in said initial compartment arrests the drainage of liquid therethrough.

7. In a filtering apparatus, a liquid container having a circumferential side wall, a base, and an upstanding overflow wall centrally of said base surrounding a central passage therethrough, a removable baffle element engaged in said container and dividing it into a plurality of successively arranged annular liquid receiving compartments, the outer one of which constitutes an initial filtering compartment in which the liquid to be filtered is initially flowed, said base having drainage holes for each of said compartments, a filtering element engaging said base to filter solid material from liquid passing therethrough, said baffle element having overflow means at a substantial distance above said base whereby the liquid rises in said initial compartment and overflows into the adjacent compartment as filtered solid material collecting in the filter element in said initial compartment arrests the drainage of liquid therethrough.

8. In a filtering apparatus, a liquid container having a circumferential side wall, a base, and an upstanding overflow wall centrally of said base surrounding a central passage therethrough, a circumferential baffle wall in inwardly spaced relation to said side wall of less height than said side wall and having overflow ports in a plane intermediate its upper and lower edges, a second baffle wall inwardly spaced from said first baffle wall having its upper edge below the plane of the upper edge of said first baffle wall and above the plane of said overflow ports, a third baffle wall intermediate said second baffle wall and said overflow wall having its upper edge below the plane of the upper edge of said second baffle wall and above the plane of said overflow wall and having overflow ports in a plane intermediate its upper and lower edges and below the plane of the upper edge of said overflow wall, said baffle walls dividing said container into a series of annular compartments, said base having drainage holes for each of said compartments, and filtering means in relation to the bases of said compartments adapted to filter solid material from liquid passing therethrough.

9. In a filtering apparatus, a liquid container having a circumferential side wall, a base, and an upstanding overflow wall centrally of said base surrounding a central passage therethrough, a circumferential baffle wall in inwardly spaced relation to said side wall of less height than said side wall and having overflow ports in a plane intermediate its upper and lower edges, a second baffle wall inwardly spaced from said first baffle wall having its upper edge below the plane of the upper edge of said first baffle wall and above the plane of said overflow ports, a third baffle wall intermediate said second baffle wall and said overflow wall having its upper edge below the plane of the upper edge of said second baffle wall and above the plane of said overflow wall and having overflow ports in a plane intermediate its upper and lower edges and below the plane of the upper edge of said overflow wall, said baffle walls dividing said container into a series of annular compartments, the annular compartment between said second and third baffle walls being substantially less in width than the widths of the other annular compartments, said base having drainage holes for each of said compartments, and filtering means in relation to the bases of said compartments adapted to filter solid material from liquid passing therethrough.

10. In a filtering apparatus, a liquid container having a circumferential side wall, and a base, a removable baffle element engaged in said container and dividing it into a plurality of successively arranged annular liquid receiving compartments, and comprising an outer circumferential baffle wall, an inner circumferential baffle wall, an intermediate circumferential baffle wall, and connection means therebetween rigidly connecting said baffle walls together, said outer and inner baffle walls each having overflow ports between their upper and lower edges and below the plane of the upper edge of said intermediate baffle wall, said base having drainage holes for each of said compartments, and a filtering element engaging said base adapted to filter solid material from liquid passing therethrough.

11. In a filtering apparatus, a liquid container having a circumferential side wall, a base, and an upstanding overflow wall centrally of said base of substantially less height than said side wall surrounding a central passage therethrough, a removable baffle element engaged in said container and dividing it into a plurality of successively arranged annular liquid receiving compartments, and comprising an outer circumferential baffle wall, an inner circumferential baffle wall, an intermediate circumferential baffle wall, and connection means therebetween rigidly connecting said baffle walls together, said outer and inner baffle walls each having overflow ports between their upper and lower edges and below the plane of the upper edge of said intermediate baffle wall, said outer, intermediate, and inner baffle walls being of successively less height and each having their upper edges in planes intermediate the planes of the upper edges of said side wall and overflow wall, said base having drainage holes for each of said compartments, and a filtering element engaging said base adapted to filter solid material from liquid passing therethrough.

12. In a filtering apparatus for filtering wash water containing explosive solid material in suspension therein, a baffle element engaged in said container comprising impervious walls dividing it into a plurality of successively arranged annular liquid receiving compartments, the outer one of which constitutes an initial filtering compartment in which the liquid to be filtered is initially flowed, said base having drainage holes for each of said compartments, filtering means in relation to the bases of said compartments adapted to filter solid material from liquid passing therethrough, the outer wall of said baffle element having overflow means at a substantial distance above said base whereby the liquid rises in said initial compartment and overflows into the adjacent compartment as filtered solid material collecting in the filter means in said initial compartment arrests the drainage of liquid therethrough.

LYMAN R. FEINAUER.
ROLAND S. PAYNE.